United States Patent
Nakamura et al.

(10) Patent No.: US 6,463,284 B2
(45) Date of Patent: *Oct. 8, 2002

(54) CONTROL OF STORAGE OF SUBSCRIBER DATA IN MOBILE COMMUNICATION SYSTEM

(75) Inventors: Shinji Nakamura; Keiko Mamiya, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,799

(22) Filed: Jul. 28, 1999

(65) Prior Publication Data

US 2002/0107018 A1 Aug. 8, 2002

(30) Foreign Application Priority Data

Dec. 17, 1998 (JP) .......................................... 10-358733

(51) Int. Cl.[7] ................................................ H04Q 7/20
(52) U.S. Cl. ........................ 455/433; 455/435; 455/512
(58) Field of Search ................................. 455/432, 433, 455/435, 412, 514, 512, 527, 507; 379/201.02

(56) References Cited

U.S. PATENT DOCUMENTS

| 5,636,210 A | * | 6/1997 | Agrawal ...................... 370/390 |
| 5,761,500 A | * | 6/1998 | Gallant et al. .............. 455/433 |
| 5,832,522 A | * | 11/1998 | Bickenstaff et al. ........ 707/204 |
| 5,850,603 A | * | 12/1998 | Lantto et al. ................ 455/433 |
| 6,021,327 A | * | 2/2000 | Nguyen et al. ............. 455/433 |

FOREIGN PATENT DOCUMENTS

| JP | 3-52398 | 3/1991 |
| JP | 4-342323 | 11/1992 |
| JP | 6-188830 | 7/1994 |
| JP | 8-223647 | 8/1996 |
| WO | 98/15133 | 4/1998 |

* cited by examiner

*Primary Examiner*—William Trost
*Assistant Examiner*—Simon Nguyen
(74) *Attorney, Agent, or Firm*—Katten Muchin Zavis Rosenman

(57) ABSTRACT

A method of storing subscriber data in a mobile-communication system includes the steps of providing a high-priority-subscriber-storage area in addition to an ordinary-subscriber-storage area, and storing subscriber data of a relevant subscriber in the high-priority-subscriber-storage area if priority of the relevant subscriber exceeds a predetermined threshold and if the ordinary-subscriber-storage area is full.

20 Claims, 19 Drawing Sheets

LOCATION-UPDATE-REQUEST MESSAGE 13-1

REGISTRATION NOTIFICATION MESSAGE 13-2

SUBSCRIBER-DATA MESSAGE 13-4

SUBSCRIBER-DATA-STORAGE AREA 13-3

PRIORITY PARAMETER 13-5

CONTROL OF STORAGE OF SUBSCRIBER DATA IN MOBILE COMMUNICATION SYSTEM

BACKGROUND OF THE INVENTION

1. Field of the Invention

The present invention generally relates to a method and a device for controlling subscriber data of mobile stations in a mobile-communication system, and particularly relates to a method and a device for controlling subscriber data which store or delete subscriber data of mobile stations in or from a visitor location register of a cellular-mobile-communication system.

2. Description of the Related Art

FIG. 16 is an illustrative drawing showing a configuration of a cellular-mobile-communication system. A cellular-mobile-communication system includes a home-location register HLR, a visitor-location register VLR, a mobile-service-switching center MSC, base stations BSS, and mobile stations MS.

The home-location register HLR stores subscriber data (mobile customer data) such as an identification number, a location, and an identification key with respect to each of the mobile stations MS covered by a home network. The home-location register HLR transmits subscriber data to a visitor-location register VLR of a given area when a mobile station MS moves to this area.

The visitor-location register VLR receives and stores the subscriber data of each mobile station MS residing in its area of control when the home-location register HLR of each mobile station MS transmits the subscriber data.

The mobile-service-switching center MSC receives a location-update request from the mobile stations MS via the base stations BSS, and requests the visitor-location register VLR to attend to location-update processing. Further, the mobile-service-switching center MSC attends to switch control of receipt and transmission of calls with respect to the location-registered mobile stations MS via the base stations BSS.

FIG. 17 is a flowchart of a process of registering a location. FIGS. 18A through 18E are illustrative drawings showing data structures of messages and data which are exchanged during the process of registering a location.

When a mobile station MS moves from a wireless service area to another wireless service area, or when a power switch of a mobile station MS is turned on, the mobile station MS receives information on the wireless service area sent from the base station BSS. When the mobile station MS detects that the received information is different from information stored in the mobile station MS, the mobile station MS transmits a signal requesting updating of a location.

Upon receiving the signal for requesting location update, the base station BSS transmits a location-update-request message 13-1 to the mobile-service-switching center MSC (step S12-1 in FIG. 17).

Upon receiving the location-update-request message 13-1, the mobile-service-switching center MSC transmits an authentication-request message to the visitor-location register VLR in order to check if the mobile station MS that requested location update is a legitimate registered station (step S12-2).

Upon receiving the authentication-request message, the visitor-location register VLR searches for a home-location register HLR that is home to the relevant mobile station MS. This search is made based on a mobile identification number of the mobile station MS. Then, the visitor-location register VLR sends the authentication-request message to the home-location register HLR that is found in the search (step S12-3).

In response to the authentication-request message, the home-location register HLR refers to the subscriber data of the mobile station MS by using the mobile identification number, and notifies the visitor-location register VLR of an authentication-request acknowledgement (step S12-4).

The visitor-location register VLR forwards the authentication-request acknowledgement to the mobile-service-switching center MSC (step S12-5).

In accordance with the authentication-request acknowledgement, the mobile-service-switching center MSC transmits a registration-notification message 13-2 to the visitor-location register VLR (step S12-6).

Upon receiving the registration-notification message 13-2 from the mobile-service-switching center MSC, the visitor-location register VLR forwards the registration-notification message 13-2 to the home-location register HLR (step S12-7).

In response to the registration-notification message 13-2 sent from the visitor-location register VLR, the home-location register HLR reads subscriber data of the relevant mobile station MS from a subscriber-data-storage area 13-3, and sends a subscriber-data message 13-4 to the visitor-location register VLR (step S12-8).

The visitor-location register VLR stores the subscriber data of the relevant mobile station MS sent from the home-location register HLR, and notifies the mobile-service-switching center MSC of a registration-notification acknowledgement (step S12-9).

Upon receiving the registration-notification acknowledgement from the visitor-location register VLR, the mobile-service-switching center MSC informs the base station BSS of a result of the location update (step S12-10).

With reference to FIG. 18A, the location-update-request message 13-1 includes a mobile identification number and a mobile-station electronic serial number of the relevant mobile station MS as well as a base-station ID of a wireless service area where the mobile station MS is currently located. The location-update-request message 13-1 is sent from the base station BSS to the mobile-service-switching center MSC.

With reference to FIG. 18B, the registration-notification message 13-2 includes the mobile identification number and the mobile-station electronic serial number of the relevant mobile station MS as well as a mobile-service-switching-center ID of the wireless service area where the mobile station MS is currently located. The registration-notification message 13-2 is sent from the mobile-service-switching center MSC to the visitor-location register VLR and from the visitor-location register VLR to the home-location register HLR.

With reference to FIG. 18D, the subscriber-data-storage area 13-3 of the home-location register HLR stores a mobile identification number, a mobile directory number, location information including a mobile-service-switching-center ID of an area of a current location, a priority parameter, etc., with respect to each mobile station MS that belongs to the home network.

The priority parameter indicates priority that is given to a subscriber service class of a relevant mobile station MS. The priority parameter may range from 0 to 15, for example, as shown in FIG. 18E.

With reference to FIG. 18C, the subscriber-data message 13-4 includes the mobile identification number, the mobile-service-switching-center ID, the mobile directory number, and the priority parameter. The subscriber-data message 13-4 is sent from the home-location register HLR to the visitor-location register VLR as a response to the registration notification, and is stored in the visitor-location register VLR.

The subscriber data stored in the visitor-location register VLR is generally deleted when the mobile station MS moves to another wireless service area. The deletion of the subscriber data is prompted by a notice sent from the home-location register HLR when a visitor-location register VLR of the new wireless service area receives and stores the subscriber data in response to a location-update request.

FIG. 19 is a flowchart of a process of deleting a location update. Here, a new visitor-location register VLR is one that is provided in an area into which the mobile station MS moves, and an old visitor-location register VLR is one that is provided in an area from which the mobile stations MS moves out. The old visitor-location register VLR has subscriber data of the mobile station MS stored therein.

From steps S14-1 to S14-7, a process of updating a location is performed with respect to the new visitor-location register VLR in the same manner as in the steps S12-1 through S12-7 of FIG. 17.

Upon receiving the registration-notification message from the new visitor-location register VLR, the home-location register HLR searches for the old visitor-location register VLR by referring to the information on the visitor location stored in the subscriber-data-storage area. Then, the home-location register HLR transmits a registration-cancellation message to the old visitor-location register VLR (step S14-8).

Having received the registration-cancellation message, the old visitor-location register VLR deletes the subscriber data of the relevant mobile station MS, and transmits a registration-cancellation acknowledgement (step S14-9).

The home-location register HLR receives the registration-cancellation acknowledgement from the old visitor-location register VLR, and, then, sends the subscriber data to the new visitor-location register VLR (step S14-10).

Steps S14-10 through S14-12 of FIG. 19 are the same as the steps S12-8 through S12-10 of the location-update process shown in FIG. 17, and a duplicate description thereof will be omitted.

As described above, each time a mobile station MS moves from a wireless service area to another wireless service area, a process of registering subscriber data needs to be performed with respect to a visitor-location register VLR of the new wireless service area. Further, the subscriber data of the relevant mobile station MS needs to be deleted from a visitor-location register VLR of the old wireless service area.

A visitor-location register VLR has only a limited memory area for storing subscriber data. since the number of mobile stations MS residing in a given area is a matter of random occurrence, a given visitor-location register VLR may receive an excessively large number of location-update requests issued from mobile stations MS. In this case, the visitor-location register VLR may have the subscriber-data-storage area thereof completely full of data, and cannot store new subscriber data. Such a visitor-location register VLR simply rejects new requests for location update in excess of the number of mobile stations MS that can be accommodated therein. A mobile station MS, which is rejected after issuing a request for location update, cannot receive a communication service.

Accordingly, there is a need for a scheme which can improve a success rate of location update when a location update is requested by a mobile station MS that belongs to a service class having high priority.

SUMMARY OF THE INVENTION

Accordingly, it is a general object of the present invention to provide a scheme which can achieve the need described above.

It is another and more specific object of the present invention to provide a scheme which can improve a success rate of location update when a location update is requested by a mobile station MS that belongs to a service class having high priority.

In order to achieve the above objects according to the present invention, a method of storing subscriber data in a mobile-communication system includes the steps of providing a high-priority-subscriber-storage area in addition to an ordinary-subscriber-storage area, and storing subscriber data of a relevant subscriber in the high-priority-subscriber-storage area if priority of the relevant subscriber exceeds a predetermined threshold and if the ordinary-subscriber-storage area is full.

The method described above utilizes information about priority of subscribers, and gives precedence to subscribers having priority exceeding the predetermined threshold so as to secure a place for storing the subscriber data of such subscribers in the high-priority-subscriber-storage area. This improves a success rate of location update (i.e., success rate of storing subscriber data) when a location update is requested by a subscriber using a mobile station MS that belongs to a service class having high priority.

According to another aspect of the present invention, a method of deleting subscriber data of a mobile station in a mobile-communication system includes the steps of checking priority of a mobile station when receiving a message indicating either a power down of the mobile station or a completion of a call by the mobile station, keeping subscriber data of the mobile station if the priority of the mobile station exceeds a predetermined threshold, and deleting the subscriber data of the mobile station if the priority of the mobile station does not exceed the predetermined threshold.

The method described above utilizes information about priority of mobile stations, and determines whether to delete subscriber data based on whether the priority of a relevant mobile station exceeds the predetermined threshold. Therefore, a mobile station having priority exceeding the threshold can keep its subscriber data registered in the system even when the mobile station is switched off or a call is completed.

According to another aspect of the present invention, a method of storing subscriber data in a mobile-communication system includes the steps of storing subscriber data of a relevant subscriber in a data-storage area if there is a space therein, and replacing subscriber data of another subscriber in the data-storage area with the subscriber data of the relevant subscriber if the data-storage area is full and if priority of the relevant subscriber exceeds a predetermined threshold, said another subscriber having lower priority than the relevant subscriber and being currently not on phone.

The method described above utilizes information about priority of subscribers, and gives precedence to subscribers having priority exceeding the predetermined threshold when registering the subscriber data of the subscribers in the data-storage area. This improves a success rate of location update (i.e., success rate of storing subscriber data) for subscribers using mobile stations MS that belong to service classes having high priority.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
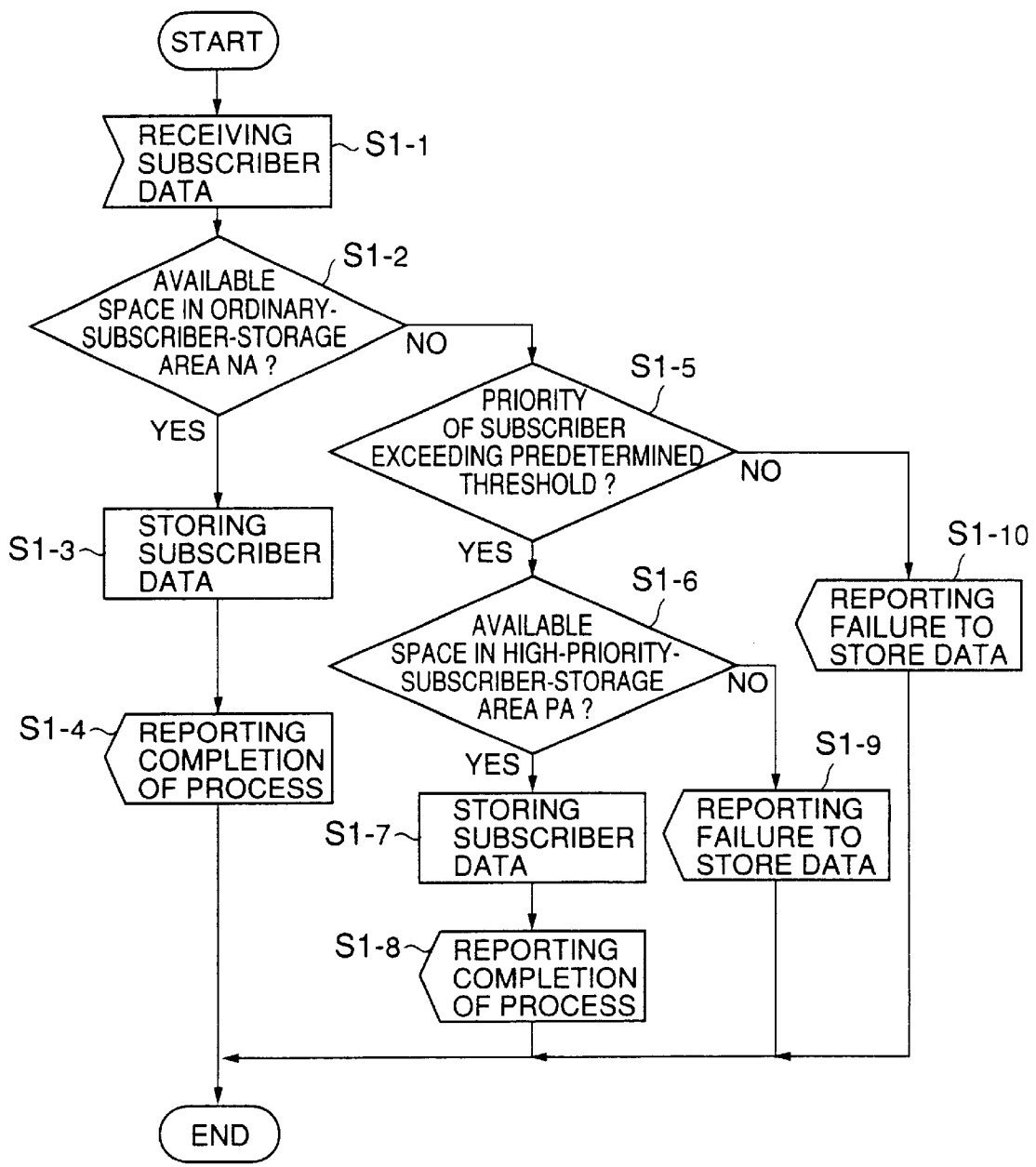
FIG. 1 is a flowchart of a process of registering a location according to a first embodiment of the present invention.
Figure 2:
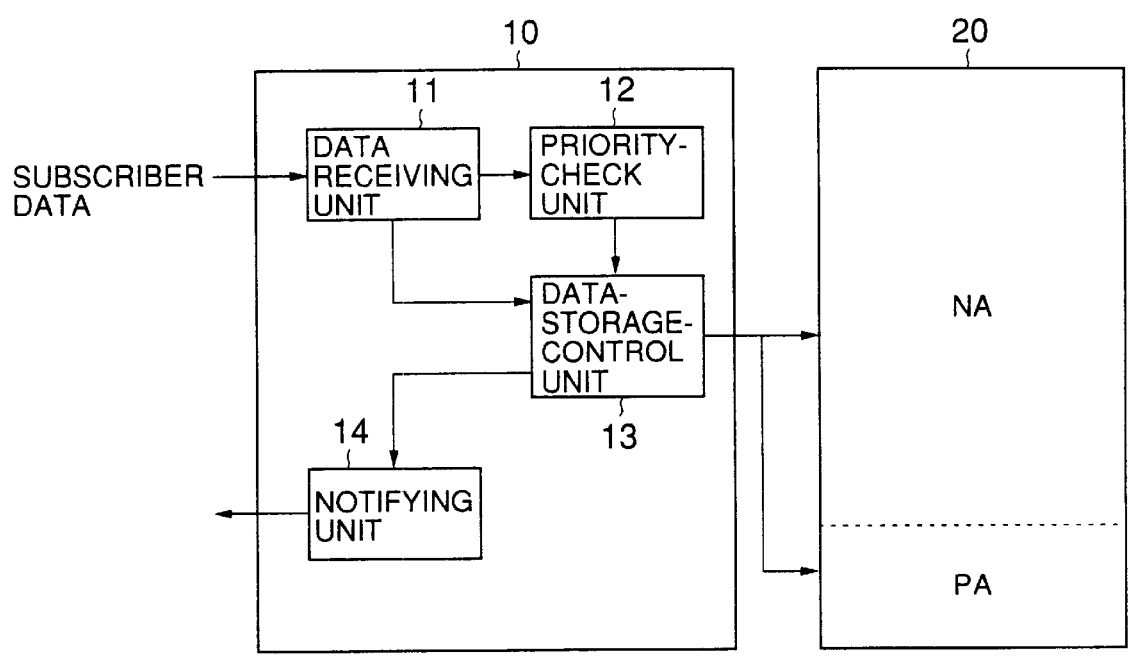
FIG. 2 is a block diagram of a device for controlling storage of subscriber data according to the first embodiment of the present invention.

FIG. 1 is a flowchart of a process of registering a location according to a first embodiment of the present invention. FIG. 2 is a block diagram of a device for controlling storage of subscriber data according to the first embodiment of the present invention.

In the first embodiment, a subscriber-data-storage area of a visitor-location register VLR is divided into two areas. One is a high-priority-subscriber-storage area PA for storing subscriber data of mobile stations MS which have priority greater than a predetermined threshold, and the other is an ordinary-subscriber-storage area NA for storing subscriber data of other mobile stations MS.

At a step S1-1, the visitor-location register VLR receives subscriber data of a subscriber from the home-location register HLR during a process of location update for this mobile-station subscriber.

At a step S1-2, a check is made as to whether there is an available space in the ordinary-subscriber-storage area NA.

If there is an available space in the ordinary-subscriber-storage area NA, the subscriber data is stored in the ordinary-subscriber-storage area NA at a step S1-3, and a notice is transmitted at a step S1-4 in order to indicate a completion of the process.

If there is not an available space in the ordinary-subscriber-storage area NA, a check is made at a step S1-5 as to whether priority of the mobile-station subscriber exceeds a predetermined threshold.

If the priority exceeds the predetermined threshold, at a step S1-6, a check is made as to whether there is an available space in the high-priority-subscriber-storage area PA.

If there is an available space in the high-priority-subscriber-storage area PA, at a step S1-7, the subscriber data is stored in the high-priority-subscriber-storage area PA. At a step S1-8, a notice is transmitted in order to indicate a completion of the process.

If there is no available space in the high-priority-subscriber-storage area PA, at a step S1-9, a notice is transmitted in order to indicate a failure to store the data. Further, if the priority does not exceed the threshold at the step S1-5, at a step S1-10, a notice is transmitted in order to indicate a failure to store the data.

With reference to FIG. 2, a device 10 for controlling storage of subscriber data according to the first embodiment of the present invention includes a data receiving unit 11, a priority-check unit 12, a data-storage-control unit 13, and a notifying unit 14. The device 10 stores subscriber data in a subscriber data-storage unit 20. As previously described, the subscriber-data-storage unit 20 of the first embodiment is divided into the ordinary-subscriber-storage area NA and the high-priority-subscriber-storage area PA.

The data receiving unit 11 receives subscriber data which is requested to be registered. The priority-check unit 12 checks priority of the subscriber of the subscriber data, and informs the data-storage-control unit 13 whether the priority exceeds a predetermined threshold. The data-storage-control unit 13 stores the subscriber data in the ordinary-subscriber-storage area NA if there is a space. Alternatively, the data-storage-control unit 13 stores the subscriber data in the high-priority-subscriber-storage area PA if there is a space and if the priority of the subscriber exceeds the predetermined threshold. Depending on whether the data-storage-control unit 13 succeeds in storing the subscriber data, the notifying unit 14 transmits a notice indicating a success or a failure in storing (registering) the subscriber data in the subscriber-data-storage unit 20.

Figure 3:
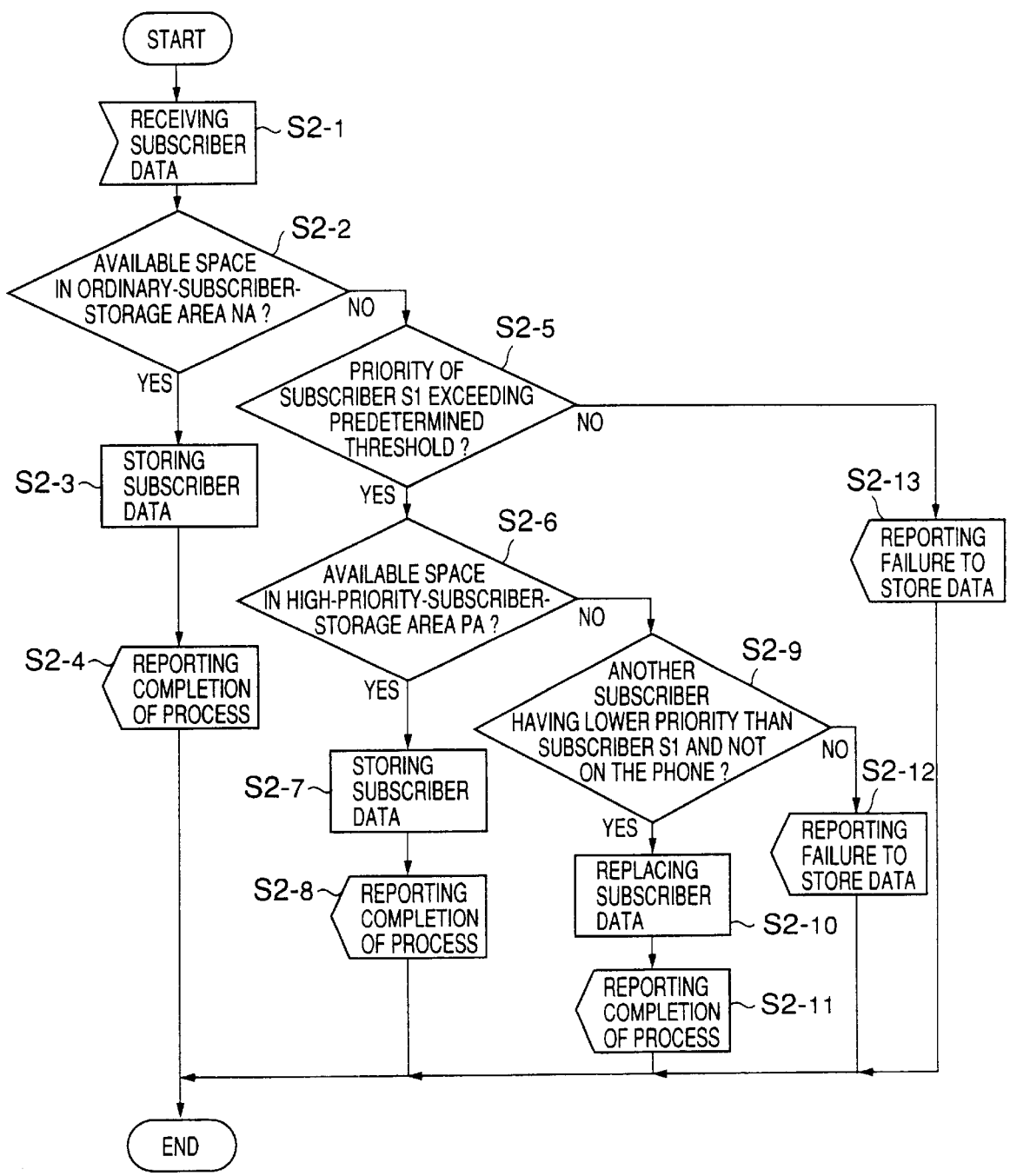
FIG. 3 is a flowchart of a process of registering a location according to a second embodiment of the present invention.
Figure 4:
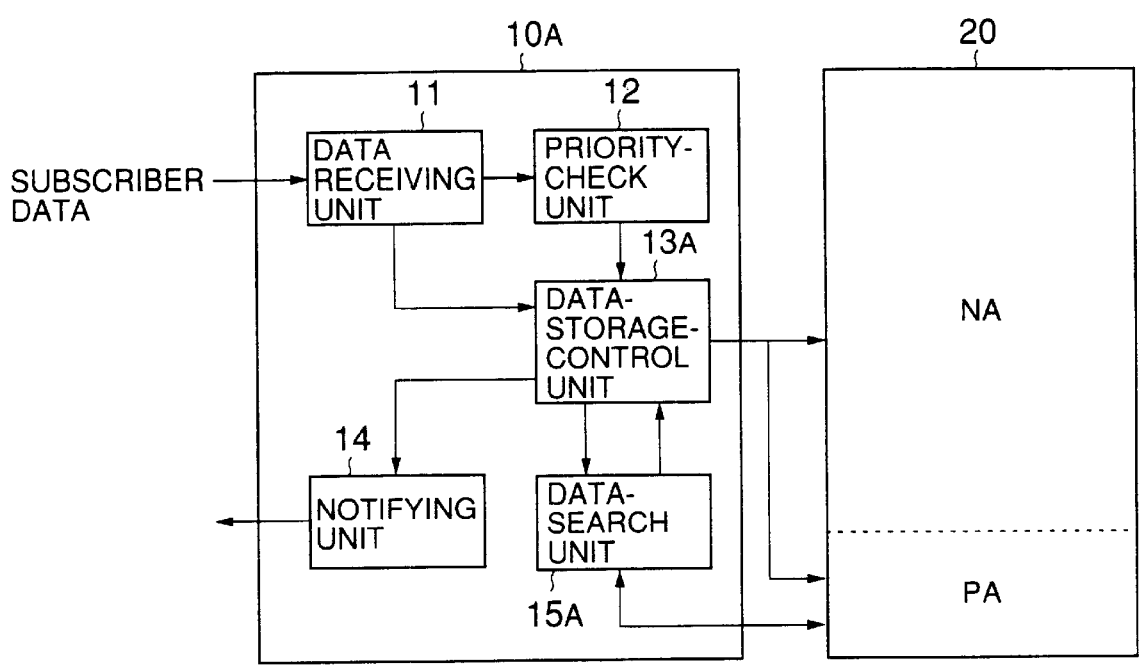
FIG. 4 is a block diagram of a device for controlling storage of subscriber data according to the second embodiment of the present invention.

FIG. 3 is a flowchart of a process of registering a location according to a second embodiment of the present invention. FIG. 4 is a block diagram of a device for controlling storage of subscriber data according to the second embodiment of the present invention.

In the second embodiment, a subscriber-data-storage area of a visitor-location register VLR is divided into two areas. One is a high-priority-subscriber-storage area PA for storing subscriber data of mobile stations MS which have priority greater than a predetermined threshold, and the other is an ordinary-subscriber-storage area NA for storing subscriber data of other mobile stations MS.

At a step S2-1, the visitor-location register VLR receives subscriber data of a subscriber S1 from the home-location register HLR during a process of location update for this mobile-station subscriber.

At a step S2-2, a check is made as to whether there is an available space in the ordinary-subscriber-storage area NA.

If there is an available space in the ordinary-subscriber-storage area NA, the subscriber data is stored in the ordinary-subscriber-storage area NA at a step S2-3, and a notice is transmitted at a step S2-4 in order to indicate a completion of the process.

If there is not an available space in the ordinary-subscriber-storage area NA, a check is made at a step S2-5 as to whether priority of the mobile-station subscriber S1 exceeds a predetermined threshold.

If the priority exceeds the predetermined threshold, at a step S2-6, a check is made as to whether there is an available space in the high-priority-subscriber-storage area PA.

If there is an available space in the high-priority-subscriber-storage area PA, at a step S2-7, the subscriber data is stored in the high-priority-subscriber-storage area PA. At a step S2-8, a notice is transmitted in order to indicate a completion of the process.

If there is no available space in the high-priority-subscriber-storage area PA, at a step S2-9, a check is made as to whether there is a subscriber S2 registered in the high-priority-subscriber-storage area PA who has lower priority than the subscriber S1, and is not on the phone.

If there is such a lower-priority subscriber S2, at a step S2-10, subscriber data of the lower-priority subscriber S2 is replaced by the subscriber data of the subscriber S1, and a notice is transmitted at a step S2-11 in order to indicate a completion of the process.

When the subscriber data of the lower-priority subscriber S2 is replaced by the subscriber data of the subscriber S1, the subscriber data of the lower-priority subscriber S2 is moved to the ordinary-subscriber-storage area NA by replacing subscriber data of another subscriber who is not on the phone. This insures that the subscriber data of the lower-priority subscriber S2 is stored in the ordinary-subscriber-storage area NA.

If it turns out at the step S2-9 that there is no such a lower-priority subscriber, a notice is transmitted at a step S2-12 in order to indicate a failure to store the subscriber data. Further, if the priority does not exceed the threshold at the step S2-5, at a step S2-13, a notice is transmitted in order to indicate a failure to store the subscriber data.

With reference to FIG. 4, a device 10A for controlling storage of subscriber data according to the second embodiment of the present invention includes the data receiving unit 11, the priority-check unit.12, a data-storage-control unit 13A, the notifying unit 14, and a data-search unit 15A. In FIG. 4, the same elements as those of FIG. 2 are referred to by the same numerals, and a description thereof will be omitted.

The data-storage-control unit 13A stores the subscriber data in the ordinary-subscriber-storage area NA if there is a space. Alternatively, the data-storage-control unit 13A stores the subscriber data in the high-priority-subscriber-storage area PA if there is a space and if the priority of the subscriber exceeds the predetermined threshold. Even if there is no space in the high-priority-subscriber-storage area PA, the data-search unit 15A searches for a subscriber in the high-priority-subscriber-storage area PA who has lower priority than the relevant subscriber and is not on the phone. If such a subscriber having lower priority is found, the data-storage-control unit 13A replaces the subscriber having lower priority with the relevant subscriber. Further, the data-storage-control unit 13A moves the subscriber having lower priority from the high-priority-subscriber-storage area PA to the ordinary-subscriber-storage area NA by replacing another subscriber in the ordinary-subscriber-storage area NA who is not on the phone.

Figure 5:
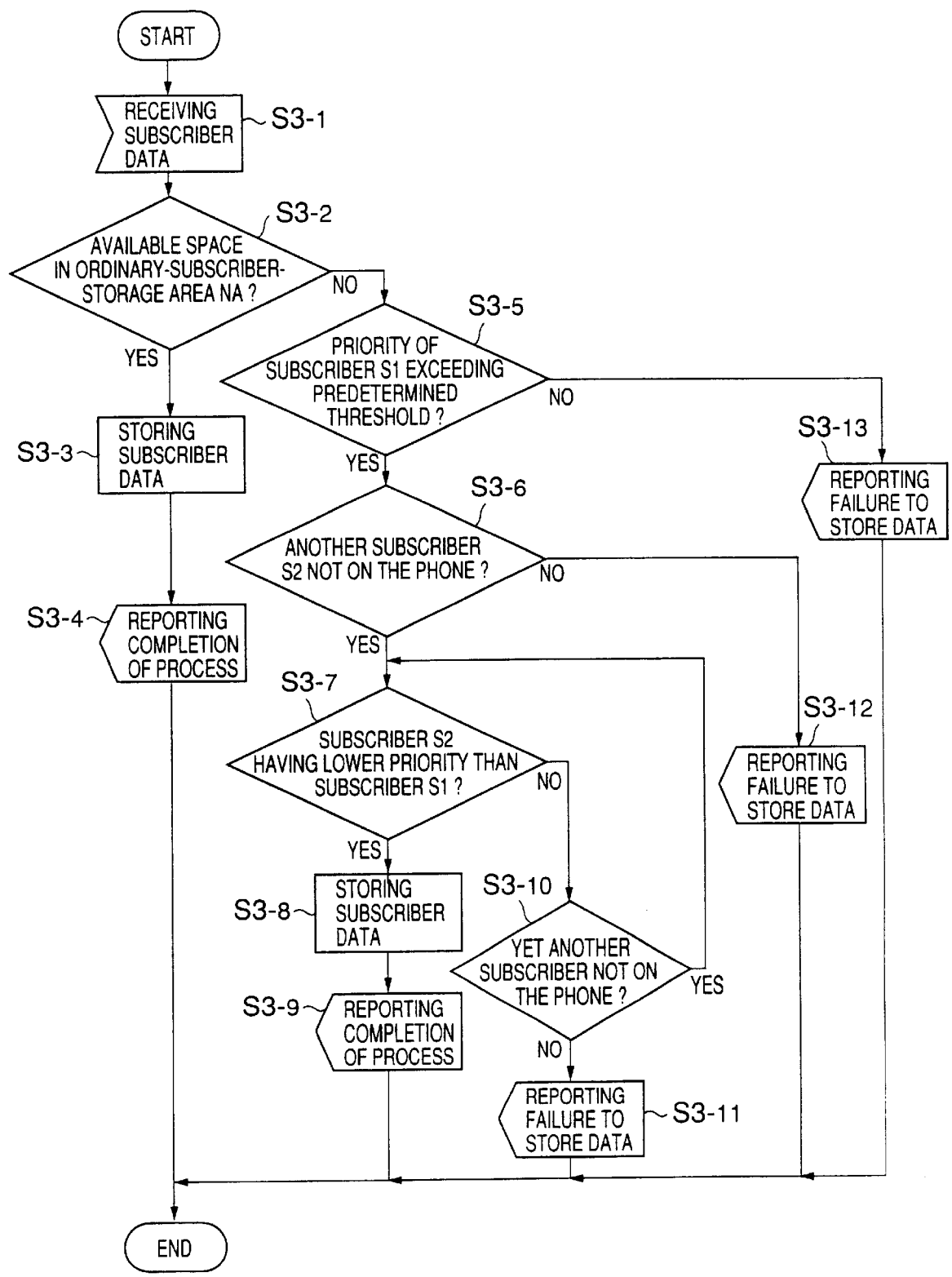
FIG. 5 is a flowchart of a process of registering a location according to a third embodiment of the present invention.
Figure 6:
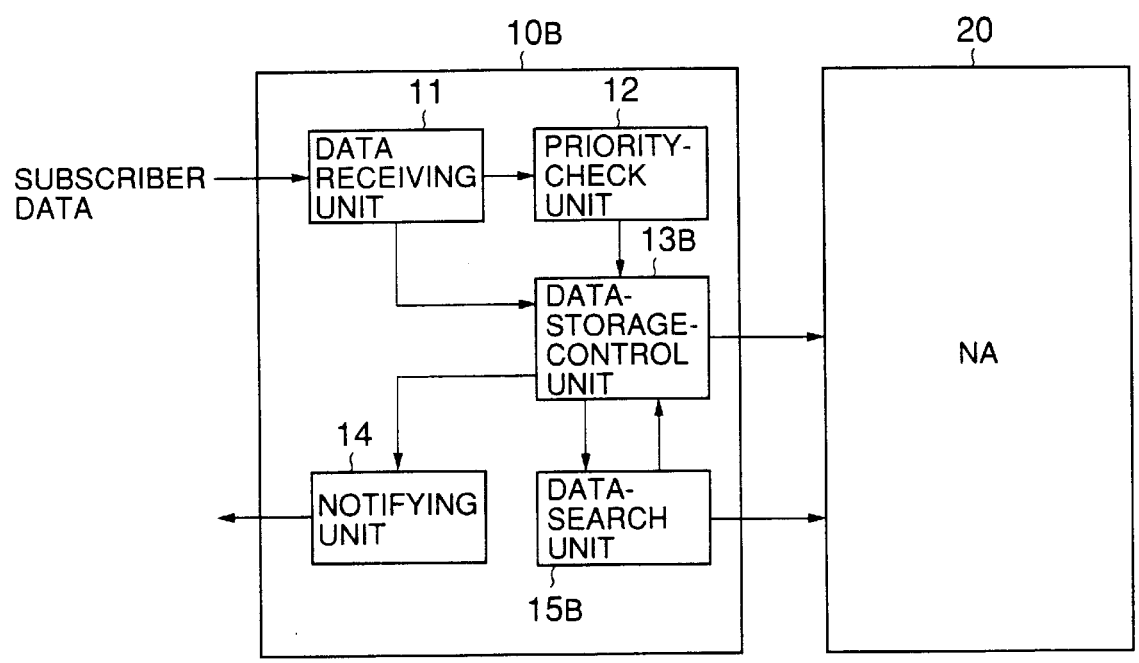
FIG. 6 is a block diagram of a device for controlling storage of subscriber data according to the third embodiment of the present invention.

FIG. 5 is a flowchart of a process of registering a location according to a third embodiment of the present invention. FIG. 6 is a block diagram of a device for controlling storage of subscriber data according to the third embodiment of the present invention.

In the third embodiment, a subscriber-data-storage area of a visitor-location register VLR has only an ordinary-subscriber-storage area NA.

At a step S3-1, the visitor-location register VLR receives subscriber data of a subscriber S1 from the home-location register HLR during a process of location update for this mobile-station subscriber.

At a step S3-2, a check is made as to whether there is an available space in the ordinary-subscriber-storage area NA.

If there is an available space in the ordinary-subscriber-storage area NA, the subscriber data is stored in the ordinary-subscriber-storage area NA at a step S3-3, and a notice is transmitted at a step S3-4 in order to indicate a completion of the If there is not an available space in the ordinary-subscriber-storage area NA, a check is made at a step S3-5 as to whether priority of the mobile-station subscriber S1 exceeds a predetermined threshold.

If the priority exceeds the predetermined threshold, at a step S3-6, a check is made as to whether there is a subscriber S2 in the ordinary-subscriber-storage area NA who is not on the phone.

If there is a subscriber S2 who is not on the phone, at a step S3-7, a check is made as to whether priority of the mobile-station subscriber S2 is lower than the priority of the subscriber S1.

If the priority of the subscriber S2 is lower than the priority of the subscriber S1, at a step S3-8, subscriber data of the subscriber S2 is replaced by the subscriber data of the subscriber S1, and a notice is transmitted at a step S3-9 in order to indicate a completion of the process.

If the check at the step S3-7 finds that the priority of the subscriber S2 is not lower than the priority of the subscriber S1, at a step S3-10, a check is made as to whether there is another subscriber who is not on the phone.

If there is no such a subscriber who is not on the phone, at a step S3-11, a notice is transmitted in order to indicate a failure to store the subscriber data.

If there is such a subscriber who is not on the phone, the procedure goes back to the step S3-7, and repeats the following steps.

If it turns out at the step S3-6 that there is no such a subscriber who is not on the phone, a notice is transmitted at a step S3-12 in order to indicate a failure to store the subscriber data. Further, if the priority does not exceed the threshold at the step S3-5, at a step S3-13, a notice is transmitted in order to indicate a failure to store the subscriber data.

With reference to FIG. 6, a device 10B for controlling storage of subscriber data according to the third embodiment of the present invention includes the data receiving unit 11, the priority-check unit 12, a data-storage-control unit 13B, the notifying unit 14, and a data-search unit 15B. The subscriber-data-storage unit 20 has only the ordinary-subscriber storage area NA. In FIG. 6, the same elements as those of FIG. 4 are referred to by the same numerals, and a description thereof will be omitted.

The data-storage-control unit 13B stores the subscriber data in the ordinary-subscriber-storage area NA if there is a space. Even when there is no space in the ordinary-subscriber-storage area NA, an attempt is made to create room in the ordinary-subscriber-storage area NA if the subscriber has priority higher than a predetermined threshold. Namely, the data-search unit 15B searches for a subscriber in the ordinary-subscriber-storage area NA who has lower priority than the relevant subscriber and is not on the phone. If such a subscriber having lower priority is found, the data-storage-control unit 13B replaces the subscriber having lower priority with the relevant subscriber.

Figure 7:
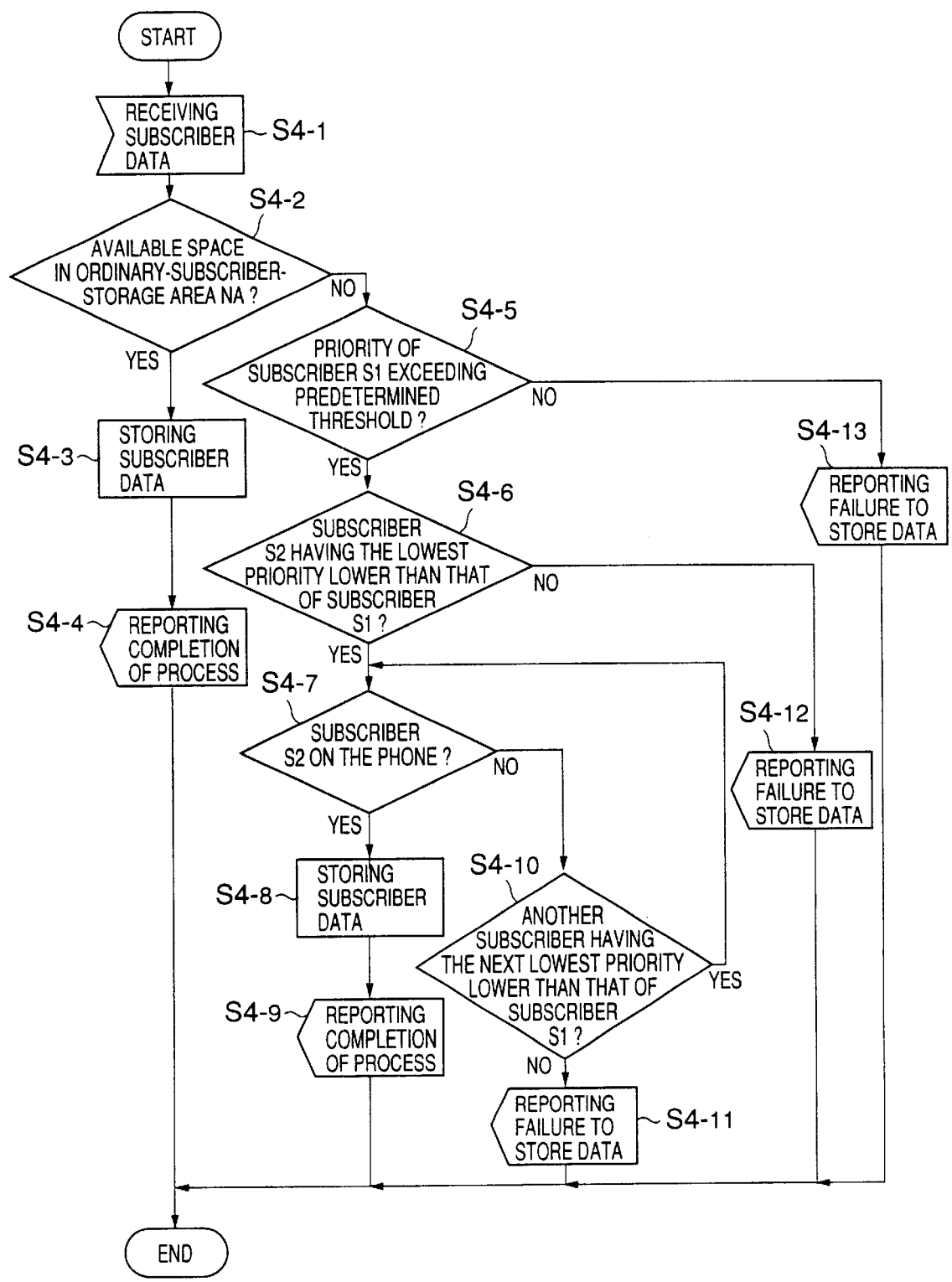
FIG. 7 is a flowchart of a process of registering a location according to a fourth embodiment of the present invention.
Figure 8:
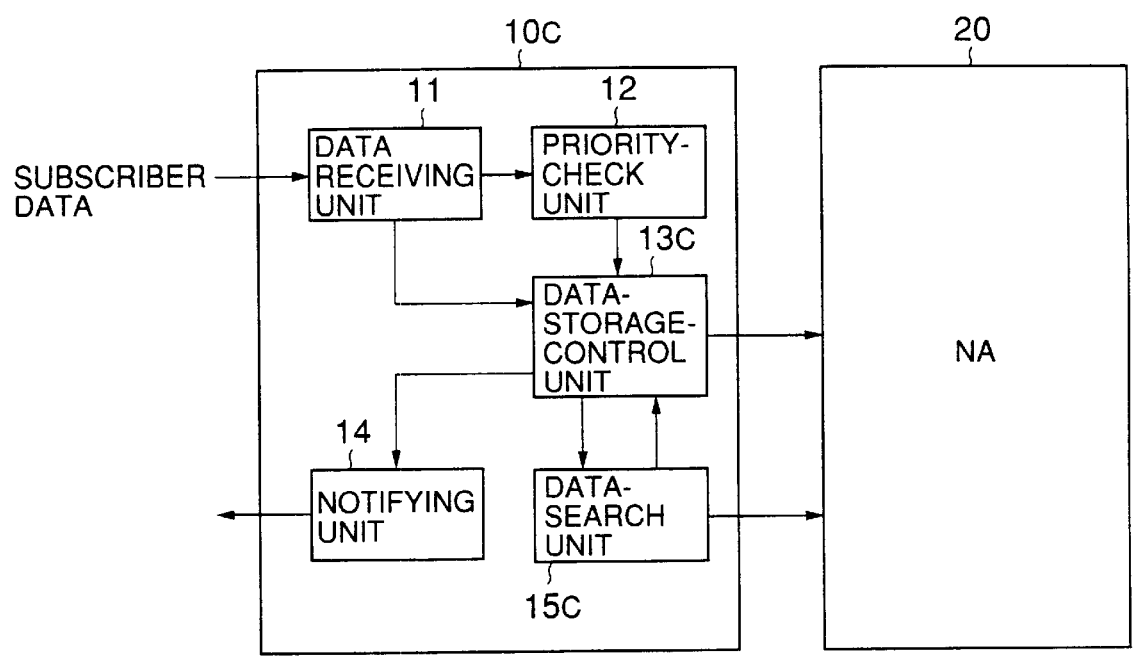
FIG. 8 is a block diagram of a device for controlling storage of subscriber data according to the fourth embodiment of the present invention.

FIG. 7 is a flowchart of a process of registering a location according to a fourth embodiment of the present invention. FIG. 8 is a block diagram of a device for controlling storage of subscriber data according to the fourth embodiment of the present invention.

In the fourth embodiment, a subscriber-data-storage area of a visitor-location register VLR has only an ordinary-subscriber-storage area NA.

At a step S4-1, the visitor-location register VLR receives subscriber data of a subscriber S1 from the home-location register HLR during a process of location update for this mobile-station subscriber.

At a step S4-2, a check is made as to whether there is an available space in the ordinary-subscriber-storage area NA.

If there is an available space in the ordinary-subscriber-storage area NA, the subscriber data is stored in the ordinary-subscriber-storage area NA at a step S4-3, and a notice is transmitted at a step S4-4 in order to indicate a completion of the process.

If there is not an available space in the ordinary-subscriber-storage area NA, a check is made at a step S4-5 as to whether priority of the mobile-station subscriber S1 exceeds a predetermined threshold.

If the priority exceeds the predetermined threshold, at a step S4-6, a check is made as to whether a subscriber S2 having the lowest priority in the ordinary-subscriber-storage area NA has lower priority than the subscriber S1. If the answer is affirmative, the procedure goes to a step S4-7.

At the step S4-7, a check is made as to whether the subscriber S2 is currently on the phone.

If the subscriber S2 is not on the phone, at a step S4-8, subscriber data of the subscriber S2 is replaced by the subscriber data of the subscriber S1, and a notice is transmitted at a step S4-9 in order to indicate a completion of the process.

If the check at the step S4-7 finds that the subscriber S2 is on the phone, at a step S4-10, a check is made as to whether another subscriber having the next lowest priority (next to the subscriber S2) has lower priority than the subscriber S2.

If the check at the step S4-10 finds that there is not such a subscriber, at a step S4-11, a notice is transmitted in order to indicate a failure to store the subscriber data.

If the check at the step S4-10 finds that there is such a subscriber, the procedure goes back to the step S4-7 to check if this subscriber is on the phone, and repeats the steps following thereto.

If it turns out at the step S4-6 that the subscriber S2 having the lowest priority in the ordinary-subscriber-storage area NA does not have lower priority than the subscriber S1, a notice is transmitted at a step S4-12 in order to indicate a failure to store the subscriber data.

Further, if the priority of the subscriber S1 does not exceed the threshold at the step S4-5, at a step S4-13, a notice is transmitted in order to indicate a failure to store the subscriber data.

With reference to FIG. 8, a device 10C for controlling storage of subscriber data according to the fourth embodiment of the present invention includes the data receiving unit 11, the priority-check unit 12, a data-storage-control unit 13C, the notifying unit 14, and a data-search unit 15C. The subscriber-data-storage unit 20 has only the ordinary-subscriber-storage area NA. In FIG. 8, the same elements as those of FIG. 4 are referred to by the same numerals, and a description thereof will be omitted.

The data-storage-control unit 13C stores the subscriber data in the ordinary-subscriber-storage area NA if there is a space. Even when there is no space in the ordinary-subscriber-storage area NA, an attempt is made to create room in the ordinary-subscriber-storage area NA if the subscriber has priority higher than a predetermined threshold. Namely, the data-search unit 15C searches for a subscriber in the ordinary-subscriber-storage area NA who has the lowest priority lower than that of the relevant subscriber among subscribers who are not on the phone. If such a subscriber having the lowest priority is found, the data-storage-control unit 13C replaces the subscriber having the lowest priority with the relevant subscriber.

Figure 9:
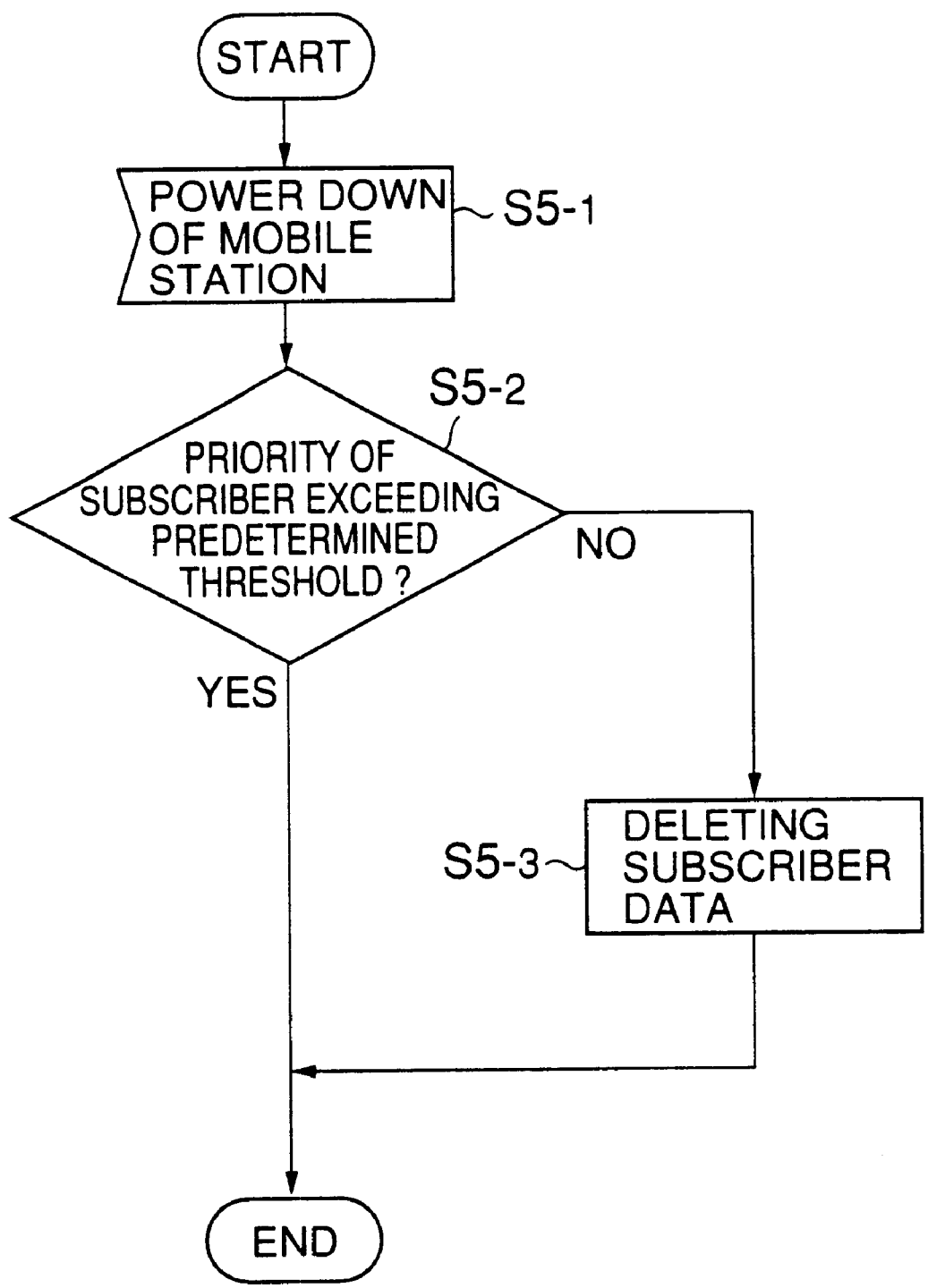
FIG. 9 is a flowchart of a process of deleting registered data according to a fifth embodiment of the present invention.

FIG. 9 is a flowchart of a process of deleting registered data according to a fifth embodiment of the present invention.

At a step S5-1, the visitor-location register VLR receives a power-down message, which indicates a power-down of a mobile station MS, and is sent via the base stations BSS and the mobile-service-switching center MSC. Here, subscriber data of this mobile station MS is kept in a subscriber-data-storage area as registered data.

At a step S5-2, a check is made as to whether priority of a subscriber service class of the mobile station MS exceeds a predetermined threshold.

If the priority of a subscriber service class of the mobile station MS does not exceeds the predetermined threshold, at a step of S5-3, the subscriber data of the mobile stations MS is removed from the subscriber-data-storage area of the visitor-location register VLR.

Figure 10:
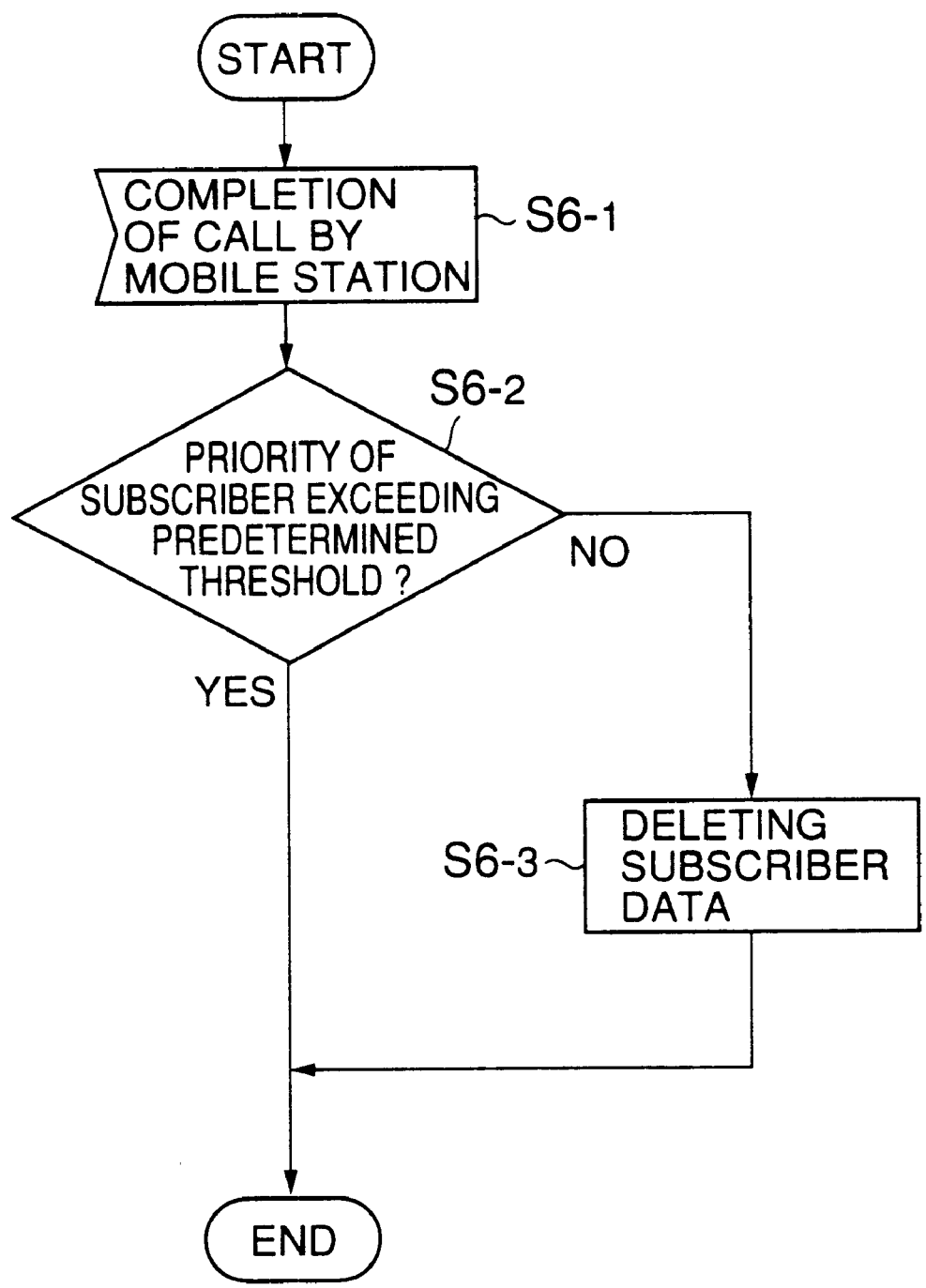
FIG. 10 is a flowchart of a process of deleting registered data according to a sixth embodiment of the present invention.

FIG. 10 is a flowchart of a process of deleting registered data according to a sixth embodiment of the present invention.

At a step S6-1, the visitor-location register VLR receives a call-completion message, which indicates a completion of a call by a mobile station MS, and is sent via the base stations BSS and the mobile-service-switching center MSC. Here, subscriber data of this mobile station MS is kept in a subscriber-data-storage area as registered data.

At a step S6-2, a check is made as to whether priority of a subscriber service class of the mobile station MS exceeds a predetermined threshold.

If the priority of a subscriber service class of the mobile station MS does not exceeds the predetermined threshold, at a step S6-3, the subscriber data of the mobile stations MS is removed from the subscriber-data-storage area of the visitor-location register VLR.

Figure 11:
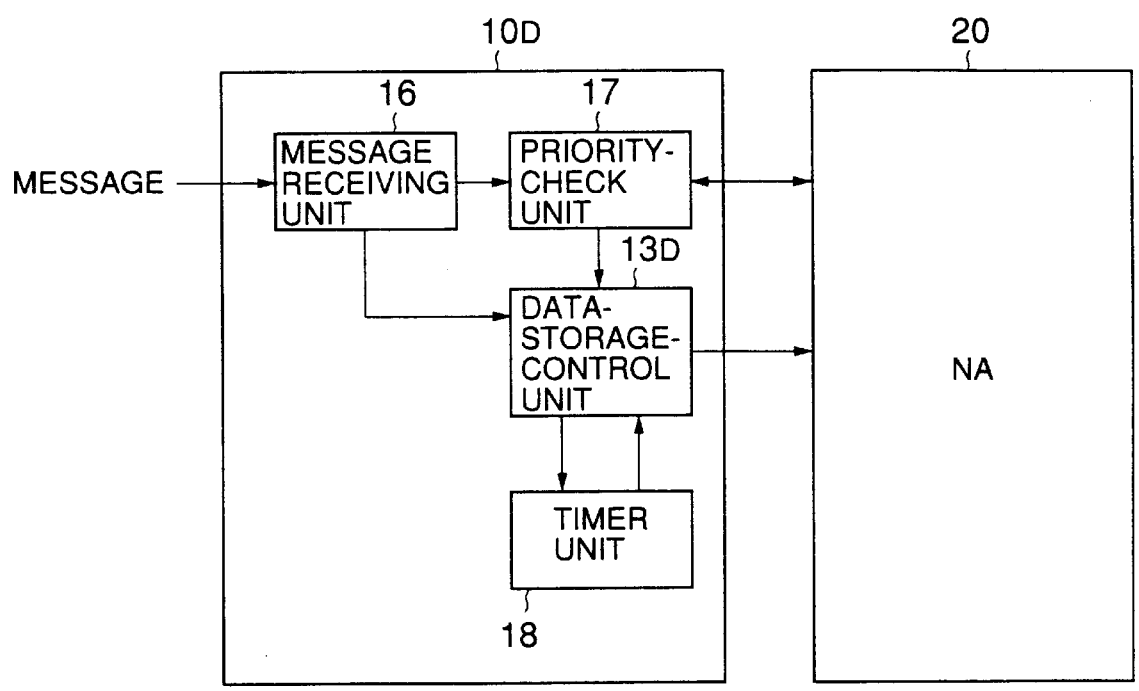
FIG. 11 is a block diagram of a device for controlling storage of subscriber data according to the fifth and sixth embodiments of the present invention.

FIG. 11 is a block diagram of a device for controlling storage of subscriber data according to the fifth and sixth embodiments of the present invention.

A device 10D for controlling storage of subscriber data according to the fifth and sixth embodiments of the present invention includes a data-storage-control unit 13D, a message receiving unit 16, and a priority-check unit 17. The configuration of FIG. 11 may be used along with any one of the configurations of the first through fourth embodiments previously described.

In FIG. 11, the message receiving unit 16 receives either a power-down message or a call-completion message. The priority-check unit 17 refers to the subscriber-data-storage unit 20 to check priority of a mobile station MS that issued the message received by the message receiving unit 16, and determines whether the priority exceeds a predetermined threshold. The data-storage-control unit 13D deletes the subscriber data of the mobile station MS from the subscriber-data-storage unit 20 if the priority does not exceeds the predetermined threshold.

A timer unit 18 of FIG. 11 is used in the following embodiments in which subscriber data will be deleted a certain time period after receiving a relevant message.

Figure 12:
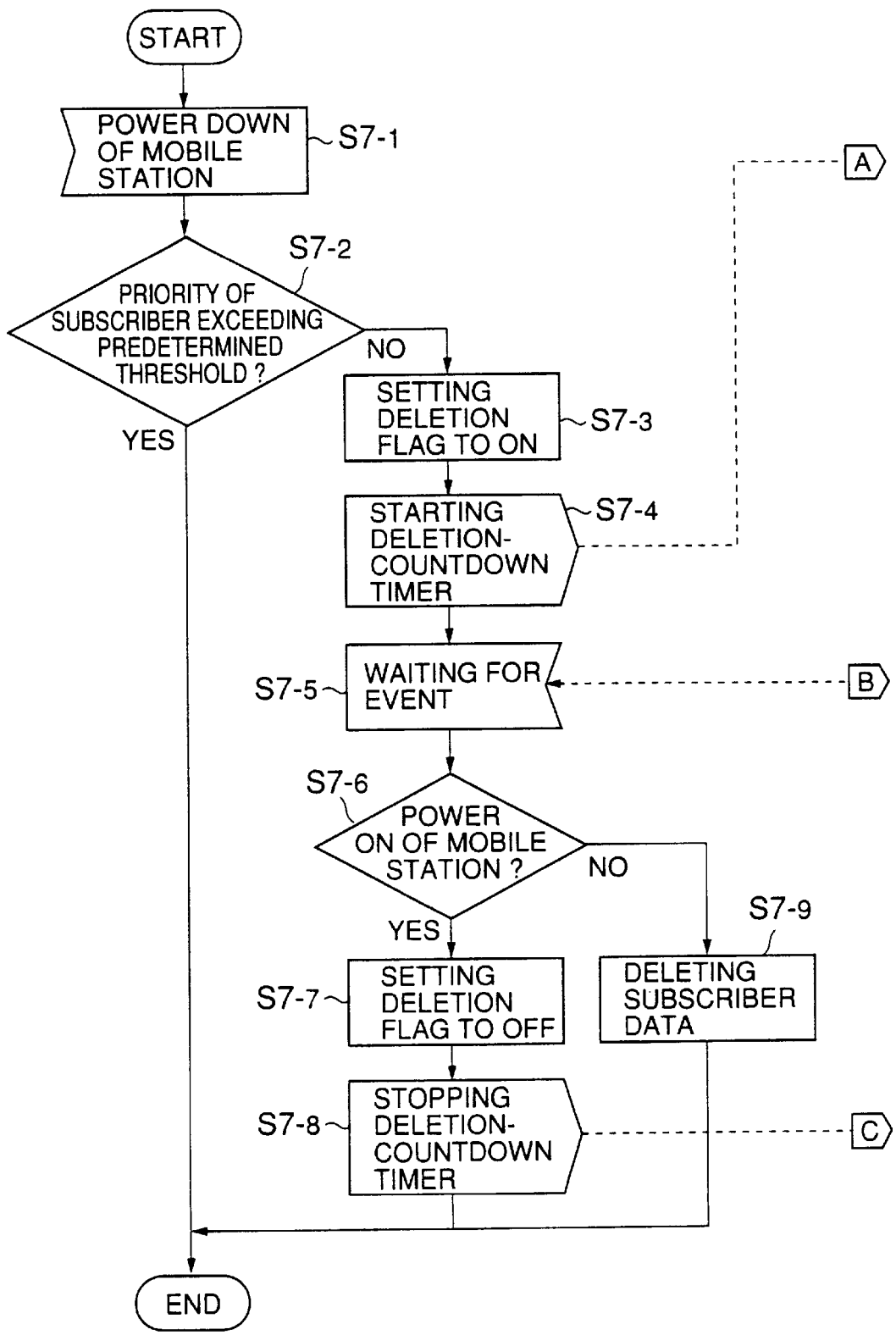
FIG. 12 is a flowchart of a process of deleting registered data according to a seventh embodiment of the present invention.

FIG. 12 is a flowchart of a process of deleting registered data according to a seventh embodiment of the present invention. In the seventh embodiment, subscriber data is deleted only a certain time period after a power-down message is received.

Figure 13:
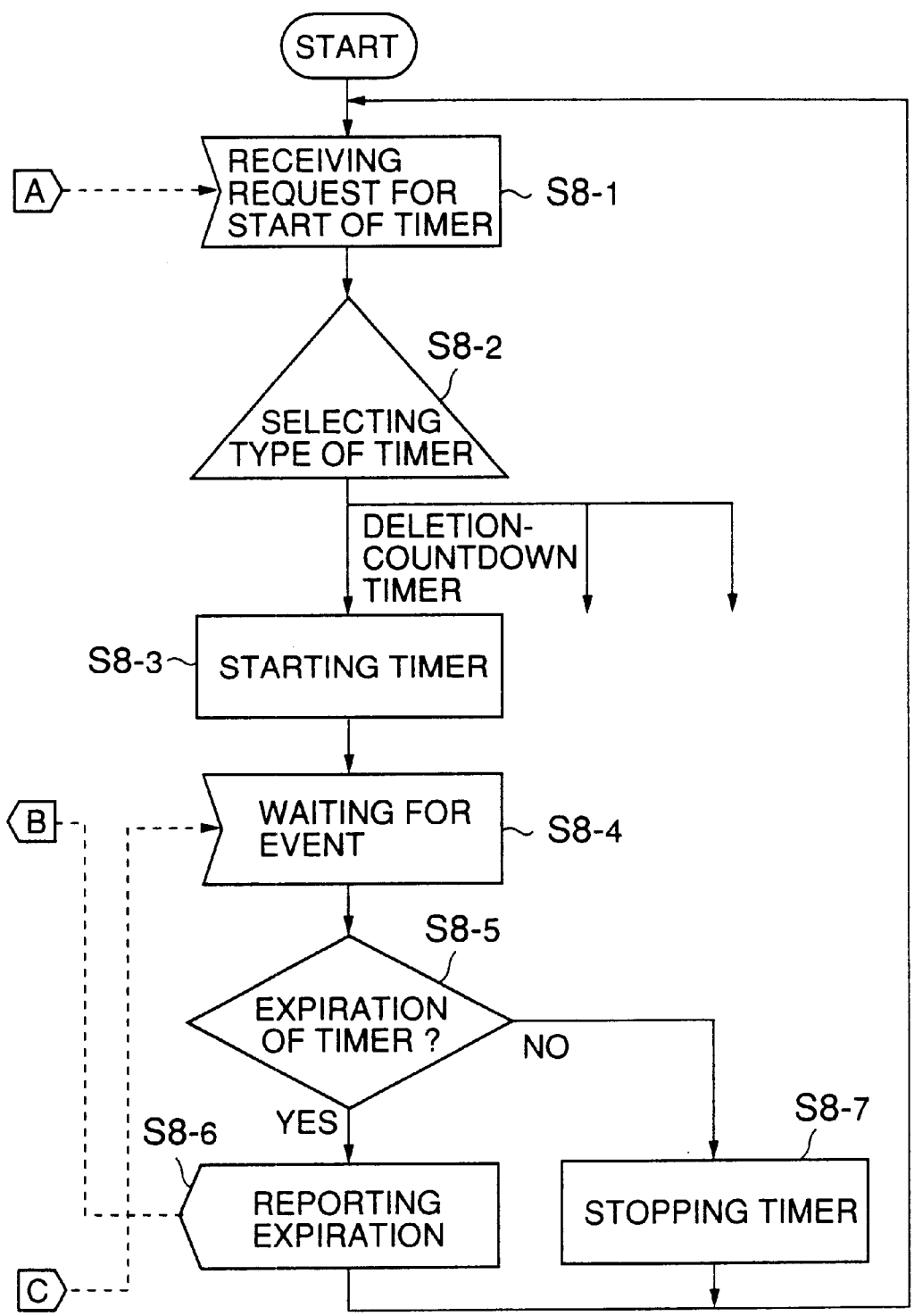
FIG. 13 is a flowchart of a process of controlling a timer.

FIG. 13 is a flowchart of a process of controlling a timer. This process is performed as part of the process of FIG. 12.

At a step S7-1, the message receiving unit 16 of the visitor-location register VLR receives a power-down message via a base station BSS and a mobile-service-switching center MSC. The power-down message indicates a power down of a mobile station MS.

At a step S7-2, the priority-check unit 17 of the visitor-location register VLR checks priority of a subscriber-service class of the mobile station MS, and determines whether the priority exceeds a predetermined threshold. If the priority exceeds the predetermined threshold, the procedure ends without deleting subscriber data.

If the priority does not exceed the predetermined threshold, at a step S7-3, a deletion flag is set to an active status.

At a step S7-4, a request to start a deletion-countdown timer is sent to the timer unit 18.

AT a step S8-1 of FIG. 13, the timer unit 18 receives the request for start of the deletion-countdown timer. At a step S8-2, a selection is made among different timers having different expiration time periods in accordance with the priority of the mobile station MS. For example, the lower the priority, the shorter the expiration time of the selected timer may be. At a step S8-3, the selected timer is started.

In FIG. 12, the data-storage-control unit 13D waits for an event to occur. Here, the event is either reception of a notice from the timer unit 18 indicating an expiration of the timer or reception of a request for location update issued in association with switching on of the mobile station MS.

At a step S7-6, a check is made as to whether the event is a reception of a request for location update associated with switching on of the mobile station MS. If it is, the deletion flag is set to inactive status at a step S7-7, and a request to stop the deletion-countdown timer is transmitted to the timer unit 18 at a step S7-8.

If it turns out at the step S7-6 that the event is a reception of a notice from the timer unit 18 indicating an expiration of the timer, at a step S7-9, subscriber data of the mobile station MS is deleted. This ends the procedure.

In FIG. 13, at a step S8-4, the timer unit 18 waits for an event to occur. Here, the event is either expiration of the timer or reception of a request from the data-storage-control unit 13D requesting a stop of the deletion-countdown timer.

At a step S8-5, a check is made as to whether the event is an expiration of the deletion-countdown timer. If it is, the expiration of the timer is reported to the data-storage-control unit 13D at a step S8-6. If the check at the step S8-5 finds that the event is a reception of a request for stop of the deletion-countdown timer sent from the data-storage-control unit 13D, the deletion-countdown timer is stopped at a step S8-7. The procedure thereafter goes back to the step S8-1.

Figure 14:
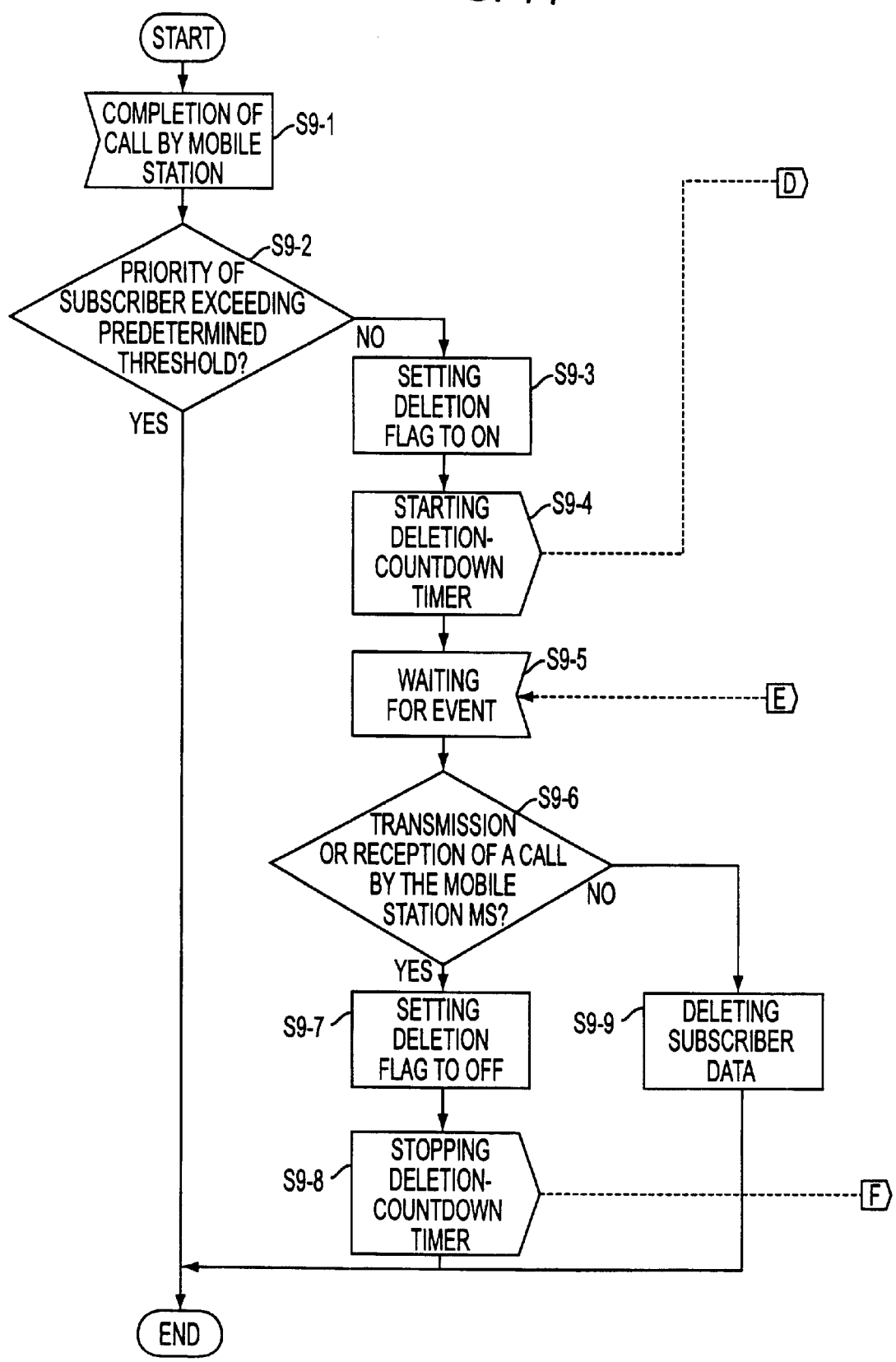
FIG. 14 is a flowchart of a process of deleting registered data according to an eighth embodiment of the present invention.

FIG. 14 is a flowchart of a process of deleting registered data according to an eighth embodiment of the present invention. In the eighth embodiment, subscriber data is deleted only a certain time period after a call-completion message is received.

Figure 15:
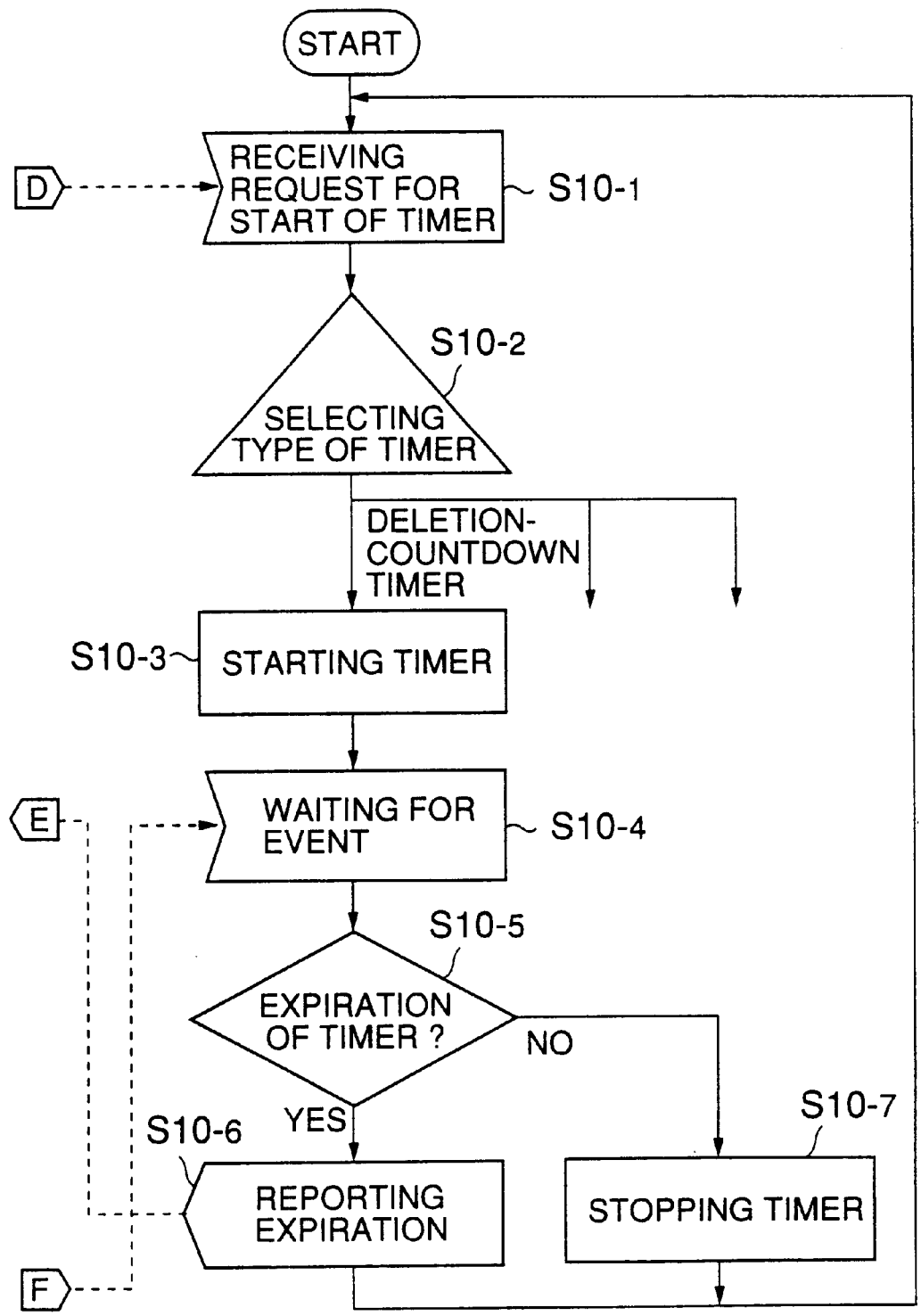
FIG. 15 is a flowchart of a process of controlling a timer.
Figure 16:
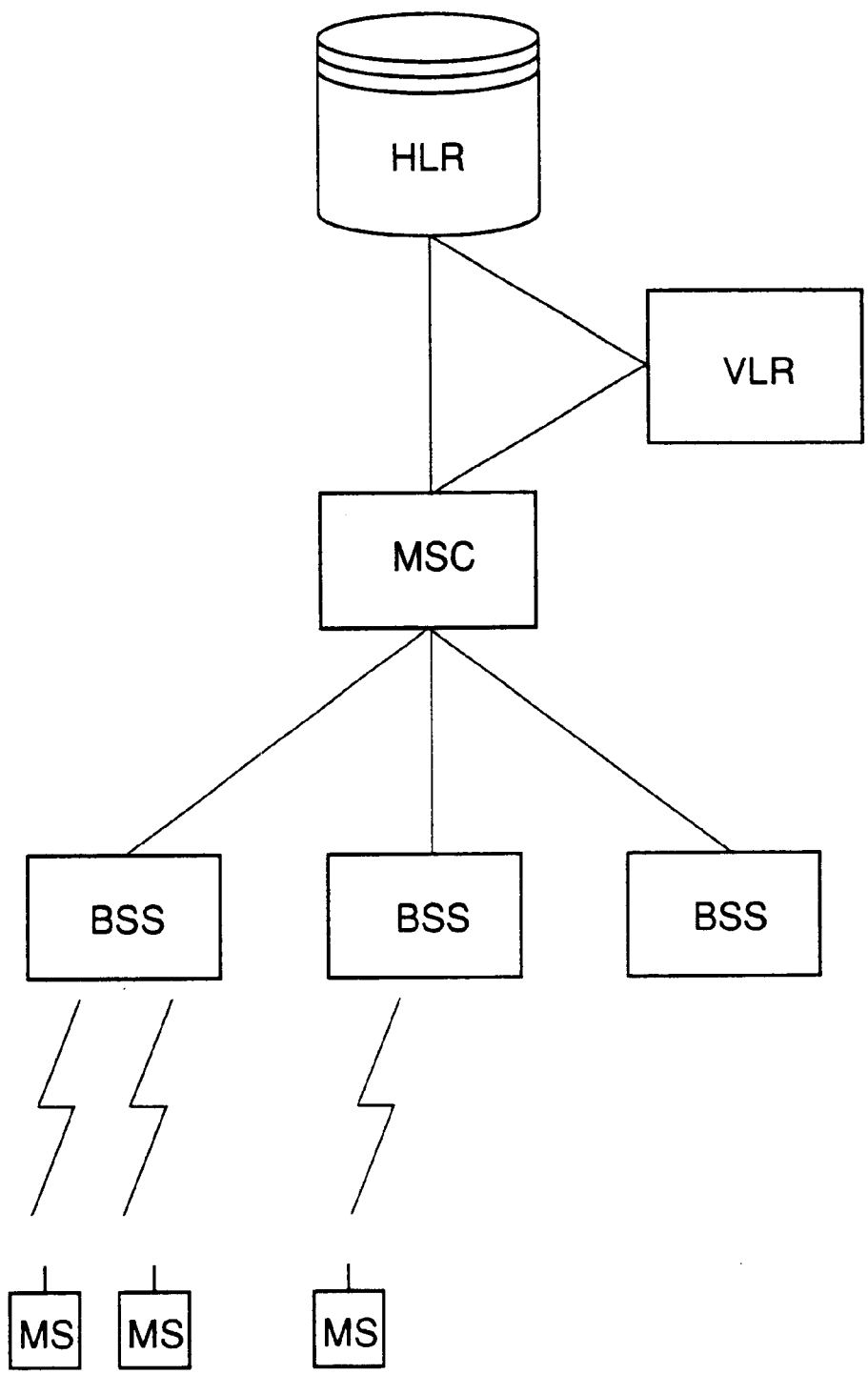
FIG. 16 is an illustrative drawing showing a configuration of a cellular-mobile-communication system.
Figure 17:
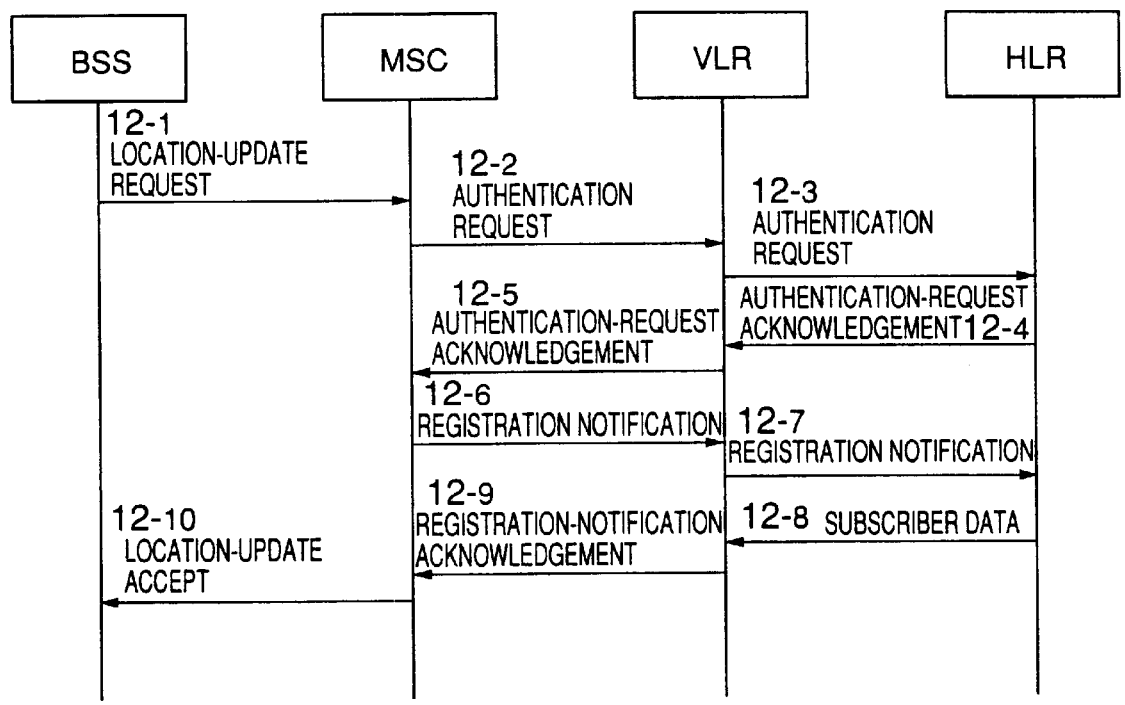
FIG. 17 is a flowchart of a process of registering a location.
Figure 18A:
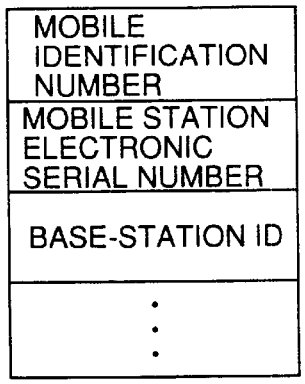
FIGS. 18A through 18E are illustrative drawings showing data structures of messages and data which are exchanged during the process of registering a location.
Figure 18B:
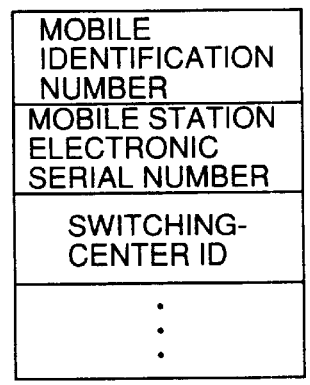
Figure 18C:
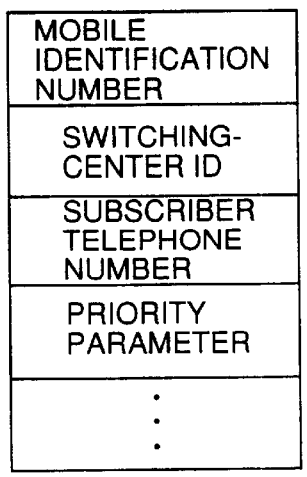
Figure 18D:
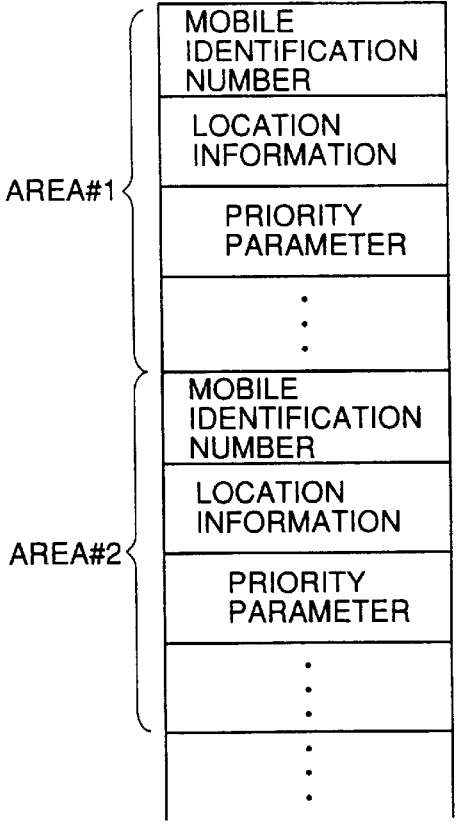
Figure 18E:
Figure 19:
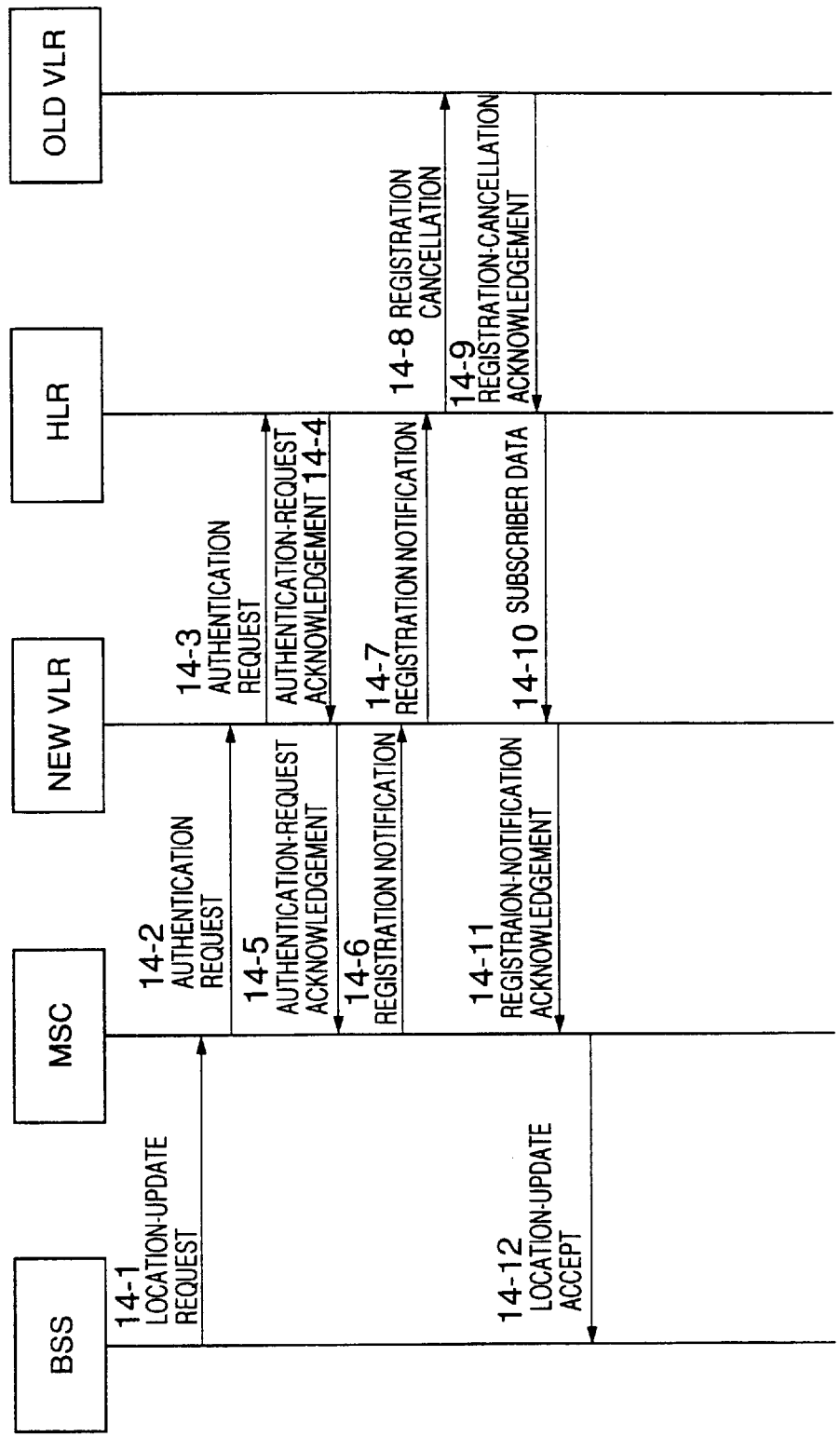
FIG. 19 is a flowchart of a process of deleting a location update.

FIG. 15 is a flowchart of a process of controlling a timer. This process is performed as part of the process of FIG. 14.

At a step S9-1, the message receiving unit 16 of the visitor-location register VLR receives a call-completion message via a base station BSS and a mobile-service-switching center MSC. The call-completion message indicates a completion of a call by a mobile station MS.

At a step S9-2, the priority-check unit 17 of the visitor-location register VLR checks priority of a subscriber-service class of the mobile station MS, and determines whether the priority exceeds a predetermined threshold. If the priority exceeds the predetermined threshold, the procedure ends without deleting subscriber data.

If the priority does not exceed the predetermined threshold, at a step S9-3, a deletion flag is set to an active status.

At a step S9-4, a request to start a deletion-countdown timer is sent to the timer unit 18.

AT a step S10-1 of FIG. 15, the timer unit 18 receives the request for start of the deletion-countdown timer. At a step S10-2, a selection is made among different timers having different expiration time periods in accordance with the priority of the mobile station MS. For example, the lower the priority, the shorter the expiration time of the selected timer may be. At a step S10-3, the selected timer is started.

In FIG. 14, the data-storage-control unit 13D waits for an event to occur. Here, the event is either reception of a notice from the timer unit 18 indicating an expiration of the timer or reception of a request for transmission or receipt of a call issued by the mobile station MS.

At a step S9-6, a check is made as to whether the event is a reception of a request for transmission or reception of a call by the mobile station MS. If it is, the deletion flag is set to inactive status at a step S9-7, and a request to stop the deletion-countdown timer is transmitted to the timer unit 18 at a step S98.

If it turns out at the step S9-6 that the event is a reception of a notice from the timer unit 18 indicating an expiration of the timer, at a step S9-9, subscriber data of the mobile station MS is deleted. This ends the procedure.

In FIG. 15, at a step S10-4, the timer unit 18 waits for an event to occur. Here, the event is either expiration of the timer or reception of a request from the data-storage-control unit 13D requesting a stop of the deletion-countdown timer.

At a step S10-5, a check is made as to whether the event is an expiration of the deletion-countdown timer. If it is, the expiration of the timer is reported to the data-storage-control unit 13D at a step S10-6. If the check at the step S10-5 finds that the event is a reception of a request for stop of the deletion-countdown timer sent from the data-storage-control unit 13D, the deletion-countdown timer is stopped at a step S10-7. The procedure thereafter goes back to the step S10-1.

As described above, the present invention utilizes a priority parameter that is set for a subscriber service class of a mobile station MS, and stores subscriber data in the subscriber-data-storage area of the visitor-location register according to the priority of the subscriber. This improves a success rate of registering a location for a subscriber having high priority. In this manner, the present invention can provide a diligent communication service that is in accordance with priority of each subscriber-service class.

Further, the present invention is not limited to these embodiments, but various variations and modifications may be made without departing from the scope of the present invention.

The present application is based on Japanese priority application No. 10-358733 filed on Dec. 17, 1998, with the Japanese Patent Office, the entire contents of which are hereby incorporated by reference.

What is claimed is:

1. A method of storing subscriber data in a mobile-communication system, comprising the steps of:
   a) checking priority of a relevant subscriber to determine whether the relevant subscriber belongs to a service class having a high priority, which exceeds a predetermined threshold;
   b) providing a high-priority-subscriber-storage area-in addition to an ordinary-subscriber-storage area;
   c) treating subscribers in different manners depending on service classes thereof by storing subscriber data of the relevant subscriber in the high-priority-subscriber-storage area only if the relevant subscriber belongs to the service class having high priority in an event that the ordinary-subscriber-storage area is full.

2. The method as claimed in claim 1, further comprising a step of storing the subscriber data of the relevant subscriber in the ordinary-subscriber-storage area if there is a space therein.

3. The method as claimed in claim 1, wherein said step c) stores the subscriber data of the relevant subscriber in the high-priority-subscriber-storage area if there is a space therein.

4. The method as claimed in claim 1, wherein said step c) further includes the steps of:
   finding another subscriber having subscriber data thereof stored in the high-priority-subscriber-storage area if there is no space in the high-priority-subscriber-storage area, said another subscriber having lower priority than the relevant subscriber and being not currently on phone; and
   creating a space in the high-priority-subscriber-storage area for storing the subscriber data of the relevant subscriber if there is no space in the high-priority-subscriber-storage area by moving the subscriber data of said another subscriber from the high-priority-subscriber-storage area to the ordinary-subscriber-storage area.

5. The method as claimed in claim 1, wherein said step c) further includes the steps of:
   finding another subscriber having subscriber data thereof stored in the high-priority-subscriber-storage area if there is no space in the high-priority-subscriber-storage area, said another subscriber having a lowest priority lower than that of the relevant subscriber and being not currently on phone; and
   creating a space in the high-priority-subscriber-storage area for storing the subscriber data of the relevant subscriber if there is no space in the high-priority-subscriber-storage area by moving the subscriber data of said another subscriber from the high-priority-subscriber-storage area to the ordinary-subscriber-storage area.

6. A method of deleting subscriber data of a mobile station in a mobile-communication system, comprising the steps of:
   a) checking priority of a mobile station when receiving a message indicating either a power down of the mobile station or a completion of a call by the mobile station to determine whether the mobile station belongs to a service class having a high priority, which exceeds a predetermined threshold;
   b) keeping subscriber data of the mobile station if the mobile station belongs to the service class having the high priority; and
   c) deleting the subscriber data of the mobile station if the mobile station does not belong to the service class having high priority, wherein
   subscribers are treated in different manners depending on the service class thereof.

7. The method as claimed in claim 6, wherein said step c) includes the steps of:
   setting a time period in accordance with the priority of the mobile station; and
   deleting the subscriber data of the mobile station at an end of said time period after receiving the message if the priority of the mobile station does not exceed the predetermined threshold.

8. The method as claimed in claim 7, wherein said step of setting a time period includes a step of setting a time period that is longer as the priority of the mobile station becomes greater.

9. A method of storing subscriber data in a mobile-communication system, comprising the steps of:
   a) checking priority of a relevant subscriber to determine whether the relevant subscriber belongs to a service class having a high priority, which exceeds a predetermined threshold;
   b) storing subscriber data of the relevant subscriber in a data-storage area if there is a space therein; and
   c) replacing subscriber data of another subscriber in the data-storage area with the subscriber data of the relevant subscriber in an event that the data-storage area is full and the relevant subscriber belongs to the service class having high priority, said another subscriber belongs to a service class having lower priority than the relevant subscriber and being currently not on phone.

10. The method as claimed in claim 9, wherein said another subscriber has a lowest fixed priority among subscribers having subscriber data thereof stored in the data-storage area who have lower fixed priority than the relevant subscriber and are currently not on phone.

11. A device for controlling storage of subscriber data in a high-priority-subscriber-storage area and an ordinary-subscriber-storage area, comprising:

a priority-check unit which checks priority of a relevant subscriber to determine whether the relevant subscriber belongs to a service class having a high priority, which exceeds a predetermined threshold; and a data-storage-control unit which stores subscriber data of the relevant subscriber in the high-priority-subscriber-storage area only if the relevant subscriber belongs to the service class having high priority in an event that the ordinary-subscriber-storage area is full, thereby treating subscribers in different manners depending on the service class thereof.

12. The device as claimed in claim 11, wherein said data-storage-control unit stores the subscriber data of the relevant subscriber in the ordinary-subscriber-storage area if there is a space therein.

13. The device as claimed in claim 11, wherein said data-storage-control unit stores the subscriber data of the relevant subscriber in the high-priority-subscriber-storage area if there is a space therein.

14. The device as claimed in claim 11, further comprises a data-search unit which finds another subscriber having subscriber data thereof stored in the high-priority-subscriber-storage area if there is no space in the high-priority-subscriber-storage area, said another subscriber having lower fixed priority than the relevant subscriber and being not currently on phone, and wherein said data-storage-control unit creates a space in the high-priority-subscriber-storage area for storing the subscriber data of the relevant subscriber if there is no space in the high-priority-subscriber-storage area by moving the subscriber data of said another subscriber from the high-priority-subscriber-storage area to the ordinary-subscriber-storage area.

15. The device as claimed in claim 11, further comprises a data-search unit which finds another subscriber having subscriber data thereof stored in the high-priority-subscriber-storage area if there is no space in the high-priority-subscriber-storage area, said another subscriber having a lowest fixed priority lower than that of the relevant subscriber and being not currently on phone, and wherein said data-storage-control unit creates a space in the high-priority-subscriber-storage area for storing the subscriber data of the relevant subscriber if there is no space in the high-priority-subscriber-storage area by moving the subscriber data of said another subscriber from the high-priority-subscriber-storage area to the ordinary-subscriber-storage area.

16. A device for deleting subscriber data of a mobile station in a mobile-communication system, comprising:

a message receiving unit which receives a message indicating either a power down of a mobile station or a completion of a call by the mobile station;

a priority-check unit which checks priority of the mobile station, when the message receiving unit receives the message, to determine whether the mobile station belongs to a service class having a high priority, which exceeds a predetermined threshold; and a data-storage-control unit which keeps subscriber data of the mobile station if the mobile station belongs to the service class having high priority, and deletes the subscriber data of the mobile station if the mobile station does not belong to the service class having high priority, thereby treating mobile stations in different manners depending on the service class thereof.

17. The device as claimed in claim 16, further comprising a timer unit which defines a time period in accordance with the fixed priority of the mobile station, and wherein said data-storage-control unit deletes the subscriber data of the mobile station at an end of said time period after the message receiving unit receives the message.

18. The device as claimed in claim 17, wherein said time period is longer as the fixed priority of the mobile station becomes greater.

19. A device of storing subscriber data in a data-storage area of a mobile-communication system, comprising:

a priority-check unit which checks priority of a relevant subscriber to determine whether the relevant subscriber belongs to a service class having a high priority, which exceeds a predetermined threshold;

a data-search unit which finds another subscriber having subscriber data thereof stored in the data-storage area who belongs to a service class having a lower priority than the relevant subscriber and being currently not on phone; and a data-storage-control unit which stores subscriber data of the relevant subscriber in the data-storage area if there is a space therein, and replacing the subscriber data of said another subscriber in the data-storage area with the subscriber data of the relevant subscriber in an event that the data-storage area is full and the relevant subscriber belongs to the service class having a high priority.

20. The device as claimed in claim 19, wherein said another subscriber has a lowest fixed priority among subscribers having subscriber data thereof stored in the data-storage area who have lower fixed priority than the relevant subscriber and are currently not on phone.

* * * * *

UNITED STATES PATENT AND TRADEMARK OFFICE
CERTIFICATE OF CORRECTION

PATENT NO.        : 6,463,284 B2                                     Page 1 of 1
APPLICATION NO. : 09/362799
DATED             : October 8, 2002
INVENTOR(S)       : Shinji Nakamura et al.

It is certified that error appears in the above-identified patent and that said Letters Patent is hereby corrected as shown below:

The entry number (73) on the front page of the patent in the left column is deleted and the following is substituted:

(73) Fujitsu Limited, Kawasaki (JP)

Signed and Sealed this

Twentieth Day of February, 2007

JON W. DUDAS
*Director of the United States Patent and Trademark Office*